United States Patent
Formanski et al.

(10) Patent No.: US 7,344,787 B2
(45) Date of Patent: Mar. 18, 2008

(54) TWO-STAGE COMPRESSION FOR AIR SUPPLY OF A FUEL CELL SYSTEM

(75) Inventors: Volker Formanski, Wiesbaden (DE); Peter Kilian, Heidelberg (DE); Thomas Herbig, Darmstadt (DE); Marc Becker, Idstein (DE)

(73) Assignee: General Motors Corporation, Detroit, MI (US)

( * ) Notice: Subject to any disclaimer, the term of this patent is extended or adjusted under 35 U.S.C. 154(b) by 573 days.

(21) Appl. No.: 10/695,709

(22) Filed: Oct. 29, 2003

(65) Prior Publication Data
US 2005/0095488 A1 May 5, 2005

(51) Int. Cl.
*H01M 8/00* (2006.01)
*H01M 8/04* (2006.01)
*H01M 8/12* (2006.01)

(52) U.S. Cl. .......................................... 429/12; 429/26
(58) Field of Classification Search ...................... None
See application file for complete search history.

(56) References Cited

U.S. PATENT DOCUMENTS 5,319,925 A    6/1994  Hendriks et al.
5,360,679 A *  11/1994 Buswell et al. ............... 429/19
6,488,345 B1 * 12/2002 Woody et al. .............. 303/152

FOREIGN PATENT DOCUMENTS

DE    101 20 947     4/2001
EP    1 009 053      10/1999

* cited by examiner

*Primary Examiner*—Patrick Joseph Ryan
*Assistant Examiner*—Julian Mercado

(57) ABSTRACT

A multi-stage compressor system that compresses air supplied to a cathode of a fuel cell system includes a first stage compressor that compresses inlet air to provide a first pressurized air stream at a first pressure. A second stage compressor includes a compression unit that compresses the first pressurized air stream to a second pressurized air stream at a second pressure. A drive unit drives the compression unit using expansion energy of an exhaust stream of the fuel cell. A first heat exchanger enables heat transfer between the second pressurized air stream and the exhaust stream to heat the exhaust stream.

28 Claims, 3 Drawing Sheets

TWO-STAGE COMPRESSION FOR AIR SUPPLY OF A FUEL CELL SYSTEM

FIELD OF THE INVENTION

The present invention relates to fuel cell systems, and more particularly to compressed oxidant supply to a fuel cell stack.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein. The proper conditioning of the feed gases is achieved by other components of the fuel cell system to provide the proper operating conditions.

The fuel cell system includes an air compressor for compressing the oxidant feed gas and a heat exchanger for cooling the oxidant feed gas. The compressor provides the appropriate operating pressure of the oxidant feed gas and the heat exchanger provides the appropriate operating temperature of the oxidant feed gas. Generally, the fuel cell system also includes a humidifier to achieve the appropriate humidification condition of the oxidant feed gas for reaction within the fuel cell stack. A coolant system provides a means for heat to be rejected from the fuel cell stack and other system components.

The design of the oxidant feed gas supply system significantly influences the overall fuel cell system. More specifically, the oxidant supply system influences power draw on the fuel cell stack for operating compressor motors and the like, as well as loading the coolant system with waste heat. As a result, it is advantageous to improve the operating efficiency of the oxidant feed gas supply system.

SUMMARY OF THE INVENTION

Accordingly, the present invention provides a multi-stage compressor system that compresses air supplied to a cathode of a fuel cell system. The multi-stage compressor system includes a first stage compressor that compresses inlet air to provide a first pressurized air stream at a first pressure. A second stage compressor includes a compression unit that compresses the first pressurized air stream to a second pressurized air stream at a second pressure. A motorized drive unit drives the first stage of the compression unit and an expander unit drives the second stage of the compression unit using expansion energy of an exhaust stream of the fuel cell. A first heat exchanger enables heat transfer between the second pressurized air stream and the exhaust stream to heat the exhaust stream.

In one feature, the multi-stage compressor system further includes a second heat exchanger disposed between the first stage compressor and the second stage compressor to reduce a temperature of the first pressurized air stream. The second heat exchanger is in series with said first heat exchanger and enables heat transfer between the first pressurized air stream and the exhaust stream.

In another feature, the multi-stage compressor system further includes a bypass valve having an open state, a closed state and a partially open state. When in the closed state, the first pressurized stream flows to the second stage compressor and when in the open state, the first pressurized stream bypasses the second stage compressor.

In still another feature, the multi-stage compressor further includes a bypass valve having a fully open state, a closed state and a partially open state. When in the closed state, the second pressurized air stream is inhibited from fluid communication with the exhaust stream. When in one of the fully open state and partially open state, a corresponding portion of the second pressurized air stream is in fluid communication with the exhaust stream.

In yet another feature, the multi-stage compressor system further includes a second heat exchanger disposed downstream of the first heat exchanger to reduce a temperature of the second pressurized air stream.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
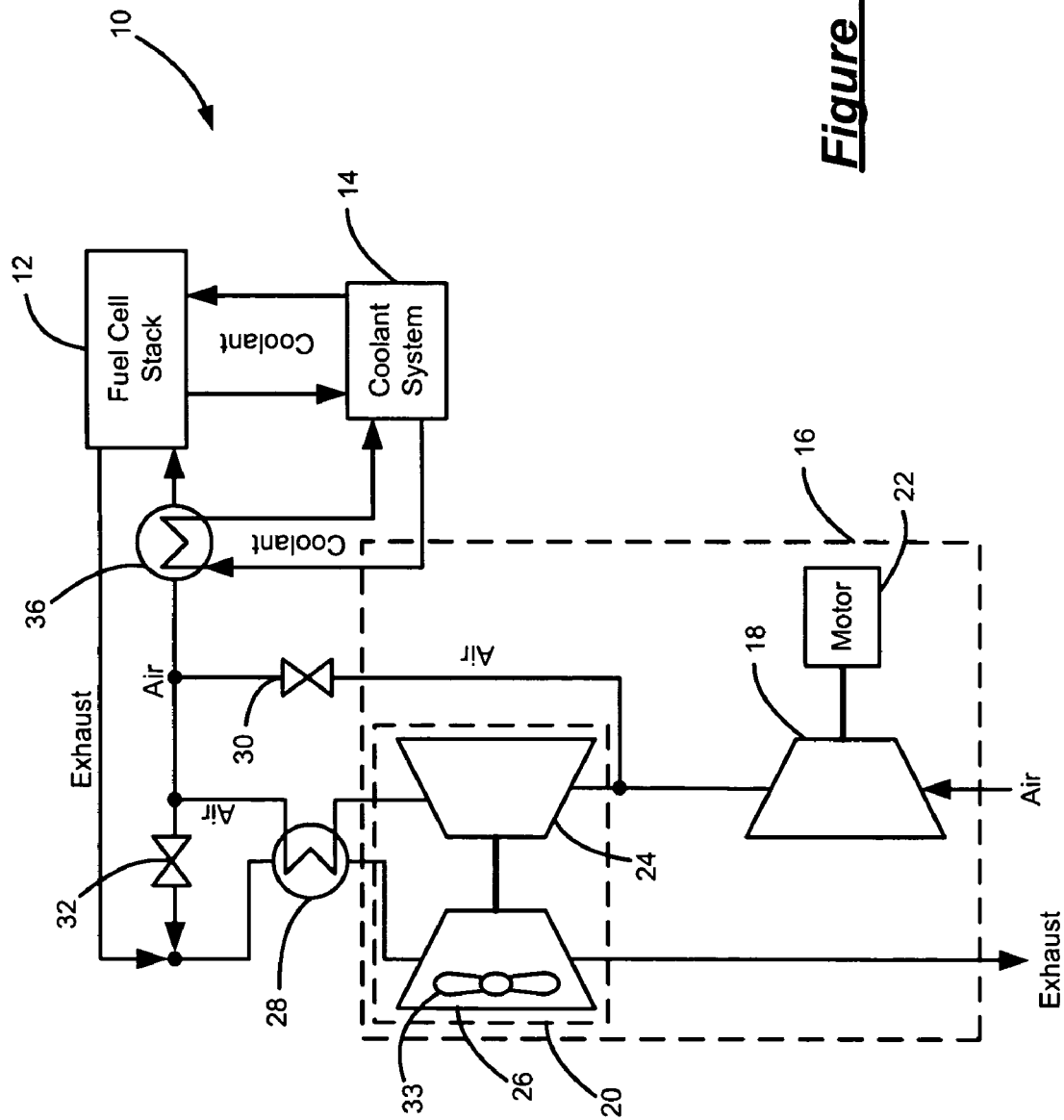
FIG. 1 is a functional block diagram of a fuel cell system incorporating two-stage air compression according to the present invention.

Referring now to FIG. 1, a fuel cell system 10 is shown. The fuel cell system 10 includes a fuel cell stack 12, a coolant system 14 and a compressor system 16. The coolant system 14 maintains the operating temperature of the fuel cell stack 12 at an appropriate level. Additionally, the coolant system 14 can optionally adjust the temperature of fluids at various points in the fuel cell system 10 as explained in further detail below. The compressor system 16 compresses oxidant that is supplied to the fuel cell stack 12. More specifically, the oxidant is supplied to a cathode side (not shown) of the fuel cell stack 12 to catalytically react with hydrogen gas supplied to an anode side (not shown) of the fuel cell stack 12. The oxidant is oxygen-rich air supplied by the compressor system 16 to an appropriate operating state (i.e., temperature and pressure). The oxidant reacts with the hydrogen gas to produce electrical power and an exhaust stream.

The compressor system 16 includes a first stage compressor 18 and a second stage compressor 20. As explained in further detail below, the first stage compressor 18 is used during a first operating mode of the fuel cell system 10 and both the first and second stage compressors 18, 20 are used during a second operating mode of the fuel cell system 10.

The first stage compressor 18 can be of a screw type, a reciprocating piston type, a pancake type, a scroll type or any other type of compressor that is driven by a motor 22, such as an electric motor. Oxygen-rich air is drawn into the first stage compressor 18 and is compressed therein to provide a first pressurized stream at a first pressure. The second stage compressor 20 is a turbo compressor or any other type of compressor 24 driven by an expander 26. More specifically, the exhaust stream flows through the expander 26, whereby the expansion energy of the exhaust stream drives the compressor 24. The first pressurized stream is drawn into the second stage compressor 20 and is compressed therein to provide a second pressurized stream at a second pressure.

A heat exchanger 28 or recuperator enables heat transfer between the second pressurized stream and the exhaust stream. In this position, the heat exchanger 28 performs two functions. First, the heat exchanger 28 enables heat transfer from the second pressurized stream to the exhaust stream to increase the exhaust stream temperature. Second, the heat exchanger 28 reduces the temperature of the second pressurized stream, easing the burden on the coolant system 14 of the fuel cell system 10. Preferably, the second pressurized stream exits the heat exchanger 28 with an appropriate temperature to enter the fuel cell stack 12.

As discussed briefly above, the fuel cell system 10 is operable in first and second modes. The first mode accounts for the nominal operating conditions the fuel cell system 10 experiences to provide electrical power. The second mode accounts for the above-average operating conditions the fuel cell system 10 experiences to provide increased electrical power. For example, for a vehicle that incorporates the fuel cell system 10, approximately 80 to 90% of the driving time is in the first mode to provide sufficient electrical power for standard driving maneuvers. The second mode accounts for the remaining driving time where more extreme vehicle maneuvers are experienced, requiring extra electrical power.

A first bypass valve 30 is included to selectively enable fluid transfer from the first stage compressor 18 directly to the fuel cell stack 12. During operation in the first mode, the first bypass valve 30 is open enabling fluid flow from the discharge of the first stage compressor 18 to the fuel cell stack 12. As discussed above, the second stage compressor 20 is not used when operating in the first mode. During operation in the second mode, the first bypass valve 30 is closed so that the first pressurized stream is supplied to the second stage compressor 20.

A second bypass valve 32 is disposed between the discharge of the second stage compressor 20 and the exhaust flow path. The second bypass valve 32 is selectively opened during operation in the second mode and control feed back flow to the expander 26. More specifically, during operation in the second mode, more expansion energy may be required to sufficiently compress the first pressurized stream in the second stage compressor 20. The second bypass valve 32 is manipulated to control a feed back stream from the discharge of the compressor 24 to the expander 26 according to the performance maps of both, the compressor 24 and the expander 26. The feed back stream mixes with the exhaust flow to provide extra expansion energy in the expander 26.

To adjust different possible operation conditions the expander 26 can be equipped with variable guide blades 33 or a waste gate bypass including a control valve (not shown). A pitch of the variable guide blades 33 is varied to increase expander efficiency and to adjust fluid pressure upstream of the expander 26. The waste gas bypass provides a bypass from the expander inlet to the expander outlet and is used during periods of medium to high volume fluid flows at the expander inlet.

When operating in the second mode, the first stage compressor 18 compresses the inlet air to produce the first pressurized stream. The first bypass valve 30 is closed to inhibit flow of the first pressurized stream directly to the fuel cell stack 12. The first pressurized stream is drawn into the second stage compressor 20 and is compressed therein to provide the second pressurized stream. The second pressurized stream is discharged from the second stage compressor 20 and flows through the heat exchanger 28.

Exhaust fluid from the fuel cell stack 12 is heated by the second pressurized stream within the heat exchanger 28. The heated exhaust fluid expands within the expander 26 to drive the turbo compressor 24. If the second bypass valve 32 is closed the second pressurized stream flows from the heat exchanger 28 to the fuel cell stack 12. If the second bypass valve 32 is open, a portion of the second pressurized stream is fed back to mix with the exhaust fluid and the remaining portion of the second pressurized stream flows to the fuel cell stack 12.

An optional heat exchanger 36 is disposed immediately prior to the inlet of the fuel cell stack 12. The optional heat exchanger 36 is in fluid communication with the coolant system 14 and enables heat transfer between the pressurized fluid entering the fuel cell stack 12 and the coolant system 14. More specifically, the optional heat exchanger 36 enables reduction of the temperature of the pressurized fluid entering the fuel cell stack 12 to an appropriate level for use in the fuel cell stack 12. The optional heat exchanger 36, if present, further adjusts the temperature of the second pressurized stream for use in the fuel cell stack 12.

Figure 2:
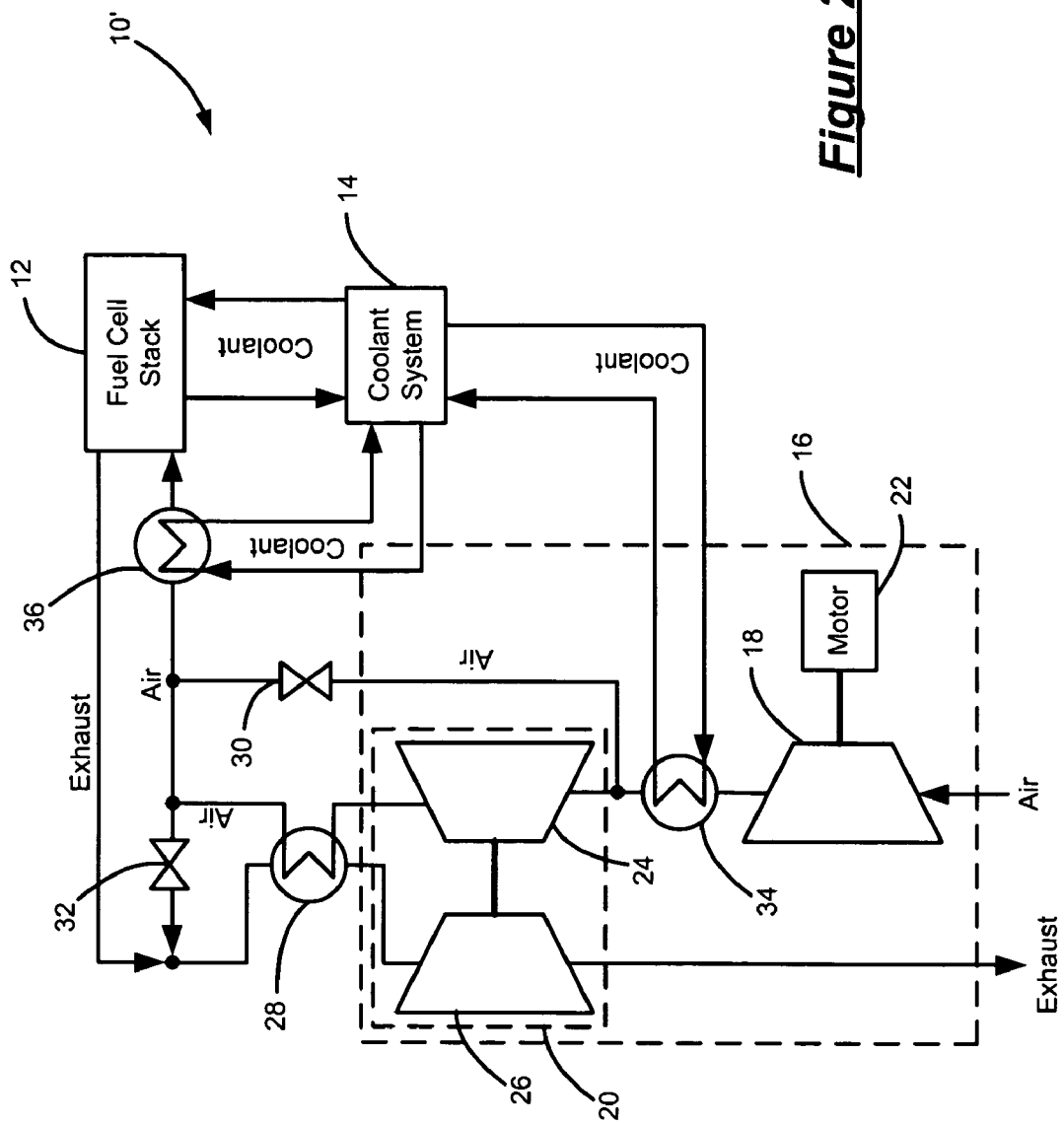
FIG. 2 is a functional block diagram of a fuel cell system incorporating two-stage air compression with an optional liquid intercooler according to the present invention.

Referring now to FIG. 2, an alternative configuration of the fuel cell system 10 is shown and is indicated as 10'. The configuration of the fuel cell system 10' is generally equivalent to the configuration of the fuel cell system 10, described in detail above. One difference, however, is that an optional liquid intercooler 34 is disposed between the first stage compressor and the second stage compressor. The optional heat exchanger 34 is in fluid communication with the coolant system 14. The optional heat exchanger 34 enables heat transfer between the first pressurized stream exiting the first stage compressor 18 and the coolant system 14. More specifically, the optional heat exchanger 34 enables reduction of the initial temperature of the first pressurized fluid to an appropriate level for compression in the second stage compressor 20 or for use in the fuel cell stack 12 depending upon the operating mode of the fuel cell system 10'.

When operating in the first mode, the first stage compressor 18 compresses the inlet air to produce the first pressurized stream. The optional heat exchanger 34 reduces the temperature of the first pressurized stream. The first bypass valve 30 is open to enable flow of the first pressurized stream to the fuel cell stack 12. The optional heat exchanger 36, if present, further adjusts the temperature of the first pressurized stream for use in the fuel cell stack 12.

Figure 3:
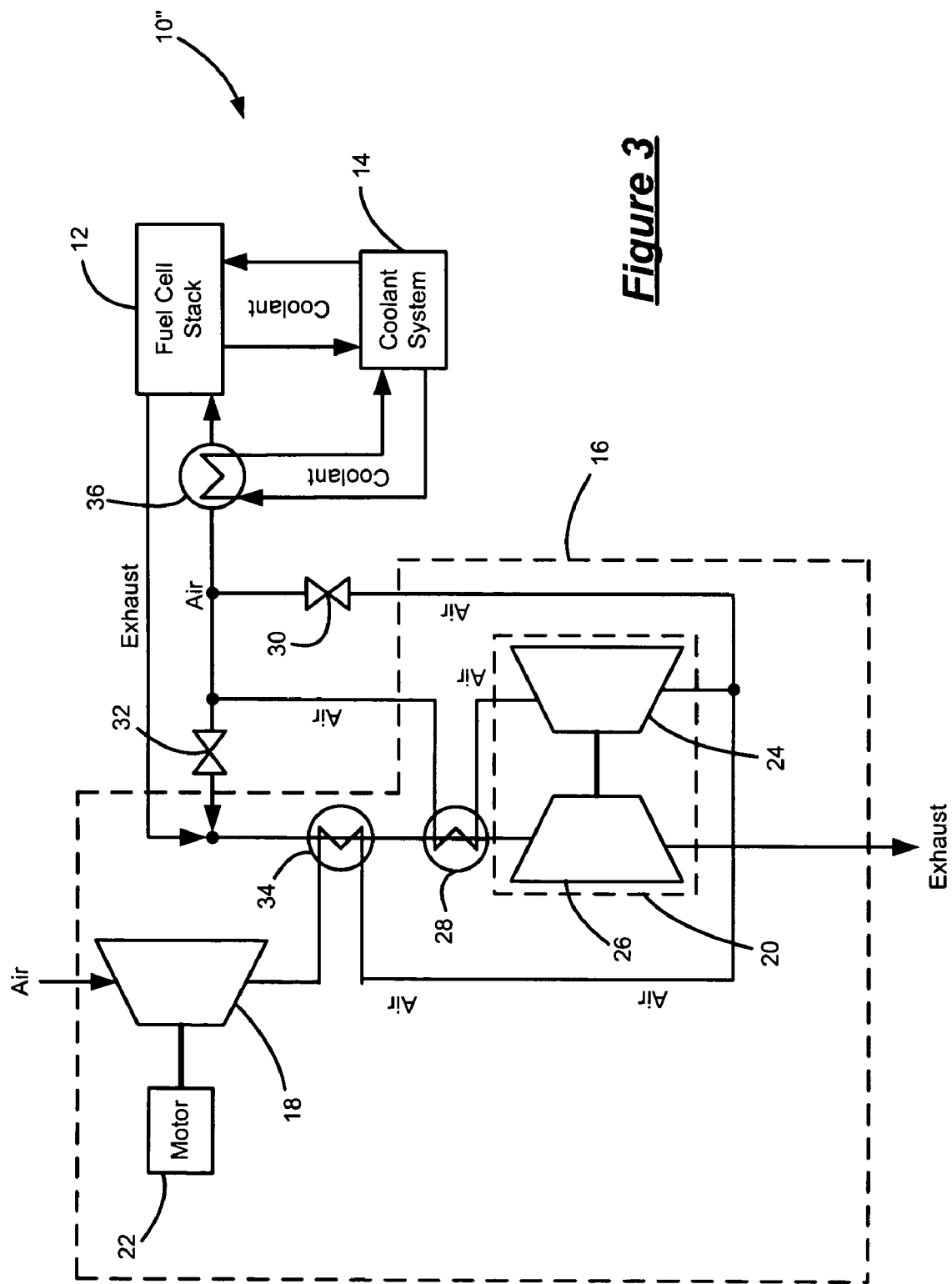
FIG. 3 is a functional block diagram of the fuel cell system incorporating alternatively configured two-stage air compression with an optional fuel cell exhaust gas intercooler according to the present invention.

Referring now to FIG. 3, a further alternative configuration of the fuel cell system 10 is shown and is indicated as 10''. The configuration of the fuel cell system 10'' is generally equivalent to the configuration of the fuel cell system 10', described in detail above. One difference, however, is that the optional heat exchanger 34 enables fluid communication between the first pressurized stream discharged from the first stage compressor 18 and the exhaust stream exiting the fuel cell stack 12. As a result, the first pressurized stream enables additional heating of the exhaust stream to provide additional expansion energy for driving the second stage compressor 20. It should also be noted that the fuel cell system 10" otherwise operates in the same manner (i.e., first and second modes) as described above for the fuel cell system 10'.

Table 1 provides a comparison between the performances of various fuel cell systems. Case 1 and Case 2 represent fuel cell systems without the advantages of the present invention. Case 3 (the fuel cell system 10), Case 4 (the fuel cell system 10') and Case 5 (the fuel cell system 10") represent configurations according to the present invention. More specifically, Case 1 indicates the performance of a fuel cell system that does not include an intercooler 34 or recuperator 28. Case 2 indicates a fuel cell system including an intercooler 34 only. Case 3 indicates the performance of the fuel cell system 10 including the recuperator 28 only. Case 4 indicates the fuel cell system 10' incorporating both the recuperator 28 and the intercooler 34 using liquid coolant for heat transfer and Case 5 indicates the performance of a fuel cell system 10" incorporating the recuperator 28 and the intercooler 34 using the fuel cell exhaust gas for heat transfer.

The performance data of Table 1 was determined based on operation with an oxidant feed gas flow of 60 g/s at a pressure of 3 bar, a fuel cell stack operating temperature of 90° C., a compressor efficiency of 60% for both compression stages, an expander efficiency of 70%, 85% efficiency for the motor and inverter for the first compression stage, and an ambient temperature of 25° C. It is appreciated that the values provided in Table 1 are merely exemplary in nature and can vary based on the particular design and performance requirements of the fuel cell systems.

TABLE 1

| System Parameter | | Case 1 | Case 2 | Case 3 | Case 4 | Case 5 |
|---|---|---|---|---|---|---|
| fuel cell system | | n/a | n/a | 10 | 10' | 10" |
| stage 1 pressure ratio [18] | — | 2.2 | 2.2 | 2.1 | 2.0 | 2.0 |
| stage 1 temp. diff. [18] | K | 129 | 122 | 114 | 113 | 110 |
| stage 1 shaft power [18] | kW | 7.8 | 7.3 | 6.9 | 6.8 | 6.7 |
| intercooler temp. diff. [34] | K | 0 | 57 | 0 | 48 | 45 |
| Intercooler heat [34] | kW | 0 | 3.4 | 0 | 2.9 | 2.2 |
| stage 2 pressure ratio [24] | — | 1.3 | 1.4 | 1.4 | 1.5 | 1.5 |
| stage 2 temp. diff. [24] | K | 60 | 59 | 76 | 68 | 72 |
| stage 2 shaft power [24] | kW | 3.6 | 3.5 | 4.6 | 4.1 | 4.4 |
| recuperator eff. [28] | % | 0 | 0 | 80 | 80 | 53 |
| expander shaft power [26] | kW | 3.6 | 3.5 | 4.6 | 4.1 | 4.4 |
| Charge air cooler temp. diff. [36] | | 125 | 59 | 125 | 68 | 82 |
| charge air cooler heat [36] | kW | 7.5 | 3.5 | 1.5 | 0.8 | 2.3 |
| Main Results: | | | | | | |
| Compressor Power [22] | kW | 9.2 | 8.6 | 8.1 | 8.0 | 7.8 |
| Total Heat to Coolant [14] | kW | 7.5 | 6.9 | 1.5 | 3.7 | 2.3 |

For Case 1, the first stage power required is 7.8 kW with a 7.5 kW heat load that the coolant system must manage. Because the first stage compressor is driven by an electric motor, 9.2 kW of fuel cell generated power is consumed to drive the electric motor. For Case 2, the inclusion of an intercooler improves performance by slightly reducing the heat load to 6.9 kW and reduces the first stage power requirement to 8.6 kW. Case 4 improves over both Cases 1 and 2 with a first stage power requirement of 8.0 kW and a heat load of 3.7 kW. Case 3, however, provides the most significant performance advantages having a first stage power requirement of 8.1 kW and a heat load of 1.5 kW. Although the first stage power requirement is slightly higher for Case 3 than for Case 4, the heat load on the coolant system is reduced by over 50% for Case 3. Case 5 is also an interesting alternative system configuration, which requires only 7.8 kW electric compressor power for stage one with a total heat rejection of 2.3 kW to the coolant system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multi-stage compressor system that compresses air supplied to a cathode of a fuel cell system, comprising:
    a first stage compressor that compresses inlet air to provide a first pressurized air stream at a first pressure;
    a second stage compressor comprising:
        a compression unit that compresses said first pressurized air stream to a second pressurized air stream at a second pressure; and
        a drive unit that drives said compression unit using expansion energy of an exhaust stream of said fuel cell;
    a first heat exchanger that enables heat transfer between said second pressurized air stream and said exhaust stream to heat said exhaust stream: and
    a bypass valve having an open state, a closed state and a partially open state, wherein when in said closed state said first pressurized stream flows to said second stage compressor, when in said open state said first pressurized stream bypasses said second stage compressor and when in said partially open state a portion of said first pressurized stream bypasses said second stage compressor.

2. The multi-stage compressor system of claim 1 further comprising a second heat exchanger disposed between said first stage compressor and said second stage compressor to reduce a temperature of said first pressurized air stream.

3. The multi-stage compressor system of claim 1 wherein in said closed state said second pressurized air stream is inhibited from fluid communication with said exhaust stream and when in one of said partially open state and fully open state a corresponding portion of said second pressurized air stream is in fluid communication with said exhaust stream.

4. The multi-stage compressor system of claim 1 further comprising a second heat exchanger disposed downstream of said first, heat exchanger to reduce a temperature of said second pressurized air stream.

5. The multi-stage compressor system of claim 1 wherein said drive unit comprises an expander having variable guide blades.

6. The multi-stage compressor system of claim 1 wherein said drive unit comprises an expander having a waste gate bypass.

7. A multi-stage compressor system that compresses air supplied to a cathode of a fuel cell system, comprising:
    a first stage compressor that compresses inlet air to provide a first pressurized air stream at a first pressure;

a second stage compressor comprising:
  a compression unit that compresses said first pressurized air stream to a second pressurized air stream at a second pressure; and
  a drive unit that drives said compression unit using expansion energy of an exhaust stream of said fuel cell;
a first heat exchanger that enables heat transfer between said second pressurized air stream and said exhaust stream to heat said exhaust stream: and
a second heat exchanger disposed between said first stage compressor and said second stage compressor to reduce a temperature of said first pressurized air stream; wherein said second heat exchanger is in series with said first heat exchanger and enables heat transfer between said first pressurized air stream and said exhaust stream.

8. A fuel cell system, comprising:
a fuel cell stack; and
a compressor system that supplies compressed air to a cathode of said fuel cell stack, said compressor system comprising:
  a first stage compressor that compresses inlet air to provide a first pressurized air stream at a first pressure;
  a second stage compressor including a compression unit that compresses said first pressurized air stream to a second pressurized air stream at a second pressure and a drive unit that drives said compression unit using expansion energy of an exhaust stream of said fuel cell stack;
  a first heat exchanger that enables heat transfer between said second pressurized air and said exhaust stream; and
  a bypass valve having an open state, a closed state and a partially open state, wherein when in said closed state said first pressurized stream flows to said second stage compressor, when in said open state said first pressurized stream bypasses said second stage compressor and when in said partially open state a portion of said first pressurized stream bypasses said second stage.

9. The fuel cell system of claim 8 further comprising a second heat exchanger disposed between said first stage compressor and said second stage compressor to reduce a temperature of said first pressurized air stream.

10. The fuel cell system of claim 8 wherein in said closed state said second pressurized air stream is inhibited from fluid communication with said exhaust stream and when one of said fully open state and said partially open state a corresponding portion of said second pressurized air stream is in fluid communication with said exhaust stream.

11. The fuel cell system of claim 8 further comprising a second heat exchanger disposed downstream of said first heat exchanger to reduce a temperature of said second pressurized air stream.

12. The fuel cell system of claim 8 wherein, said drive unit comprises an expander having variable guide blades.

13. The fuel cell system of claim 8 wherein said drive unit comprises an expander having a waste gate bypass.

14. A fuel cell system, comprising:
a fuel cell stack; and
a compressor system that supplies compressed air to a cathode of said fuel cell stack, said compressor system comprising:
  a first stage compressor that compresses inlet air to provide a first pressurized air stream at a first pressure;
  a second stage compressor including a compression unit that compresses said first pressurized air stream to a second pressurized air stream at a second pressure and a drive unit that drives said compression unit using expansion energy of an exhaust stream of said fuel cell stack;
  a first heat exchanger that enables heat transfer between said second pressurized air stream and said exhaust stream; and
  a second heat exchanger disposed between said first stage compressor and said second stage compressor to reduce a temperature of said first pressurized air stream;
wherein said second heat exchanger is in series with said first heat exchanger and enables heat transfer between said first pressurized air stream and said exhaust stream.

15. A method of operating a fuel cell system in first and second modes, comprising:
  compressing inlet air with a first compressor to provide a first pressurized air stream at a first pressure when operating in said first and second modes;
  compressing said first pressurized air stream with a second compressor to provide a second pressurized air stream at a second pressure when operating in said second mode;
  driving said second compressor using exhaust gas of said fuel cell system when operating in said second mode;
  heating said exhaust gas by way of heat transfer between said second pressurized air stream and said exhaust gas using a first heat exchanger when operating in said second mode;
  closing a bypass valve when operating in said first mode to inhibit flow of said first pressurized stream to said second compressor; and
  opening said bypass valve to one of a fully open state and a partially open state when operating in said second mode to enable flow of said first pressurized stream to said second compressor.

16. The method of claim 15 further comprising reducing a temperature of said first pressurized air stream using a second heat exchanger disposed between said first stage compressor and said second stage compressor.

17. The method of claim 15 further comprising:
  opening said bypass valve to one of a fully open state and a partially open state when operating in said second mode to enable fluid communication between a corresponding flow of said second pressurized stream and paid exhaust stream; and
  closing said bypass valve when operating in one of said first and second modes to inhibit fluid communication between said second pressurized stream and said exhaust stream.

18. The method of claim 15 further comprising reducing a temperature of said second pressurized air stream using a second heat exchanger disposed downstream of said first heat exchanger.

19. The method at claim 15 further comprising varying guide blades of an expander to regulate capacity of said second compressor.

20. The method of claim 15 wherein said step of driving said second compressor is achieved using an expander having a waste gate bypass.

21. A method of operating a fuel cell system in first and second modes comprising:

compressing inlet air with a first compressor to provide a first pressurized air stream at a first pressure when operating in said first and second modes:

compressing said first pressurized air stream with a second compressor to provide a second pressurized air stream at a second pressure when operating in said second mode;

driving said second compressor using exhaust gas of said fuel cell system when operating in said second mode;

heating said exhaust gas by way of heat transfer between said second pressurized air stream and said exhaust gas using a first heat exchanger when operating in said second mode; and reducing a temperature of said first pressurized air stream using a second heat exchanger disposed between said first stage compressor and said second stage compressor;

wherein said second heat exchanger is in series with said first heat exchanger and enables heat transfer between said first pressurized air stream and said exhaust stream.

22. A method of compressing air supplied to a cathode of a fuel cell system, comprising:

compressing inlet air with a first compressor to provide a first pressurized air stream at a first pressure;

compressing said first pressurized air stream with a second compressor to provide a second pressurized air stream at a second pressure;

driving said second compressor using exhaust gas of said fuel cell system;

heating said exhaust gas by way of heat transfer between said second pressurized air stream and said exhaust gas; and circumventing said second stage compressor when said fuel cell system is operating in a first mode and directing said first pressurized air stream to said second stage compressor when said fuel cell system is operating in a second mode.

23. The method of claim 22 wherein heating said exhaust gas by way of heat transfer between said second pressurized air stream and said exhaust gas uses a first heat exchanger; and further comprising reducing a temperature of said first pressurized air stream in a second heat exchanger disposed between said first stage compressor and said second stage compressor.

24. The method of claim 22 further comprising feeding back a portion of said second pressurized air stream to mix with said exhaust stream.

25. The method of claim 22 further comprising reducing a temperature of said second pressurized air stream.

26. The method of claim 22 further comprising regulating a capacity of said second compressor by varying guide blades of an expander.

27. The method of claim 22 wherein said step of driving said second compressor is achieved using an expander having a waste gate bypass.

28. A method of comprising air supplied to a cathode of a fuel cell system, comprising:

compressing inlet air with a first compressor to provide a first pressurized air stream at a first pressure:

compressing said first pressurized air stream with a second compressor to provide a second pressurized air stream at a second pressure;

driving said second compressor using exhaust gas or said fuel cell system;

heating said exhaust gas by way of heat transfer between said second pressurized air stream and said exhaust gas using a first heat exchanger; and reducing a temperature of said first pressurized air stream in a second heat exchanger disposed between said first stage compressor and said second stage compressor;

wherein said second heat exchanger is in series with said first heat exchanger and enables heat transfer between said first pressurized air stream and said exhaust stream.

* * * * *